Dec. 14, 1965  W. O. SEIBOLD ETAL  3,223,354
VERTICAL TAKE OFF AND LANDING AIRCRAFT
Filed Jan. 4, 1962  6 Sheets-Sheet 1
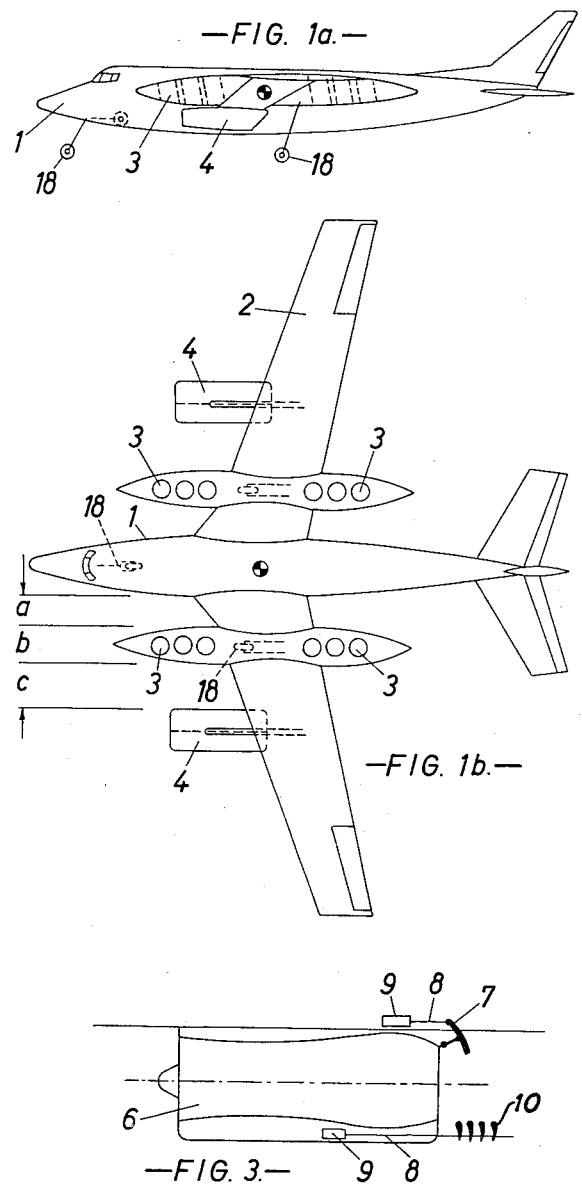
INVENTORS
WILHELM O. SEIBOLD
GERHARD EGGERS
ROLF R. B. RICCIUS
ROLF STUESSEL
Attorney Dec. 14, 1965   W. O. SEIBOLD ETAL   3,223,354
VERTICAL TAKE OFF AND LANDING AIRCRAFT
Filed Jan. 4, 1962   6 Sheets-Sheet 2
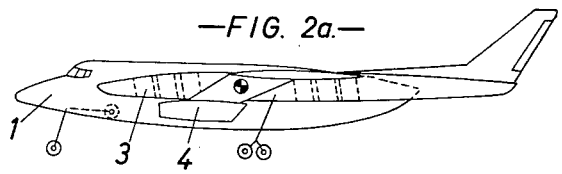
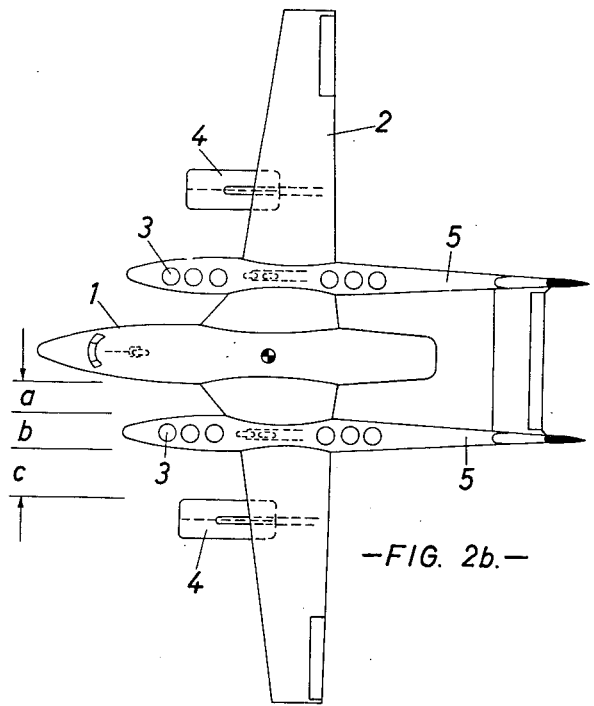
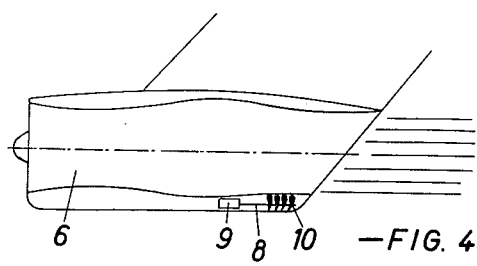
INVENTORS
WILHELM O. SEIBOLD
GERHARD EGGERS
ROLF R.B. RICCIUS
ROLF STUESSEL
BY
Attorney

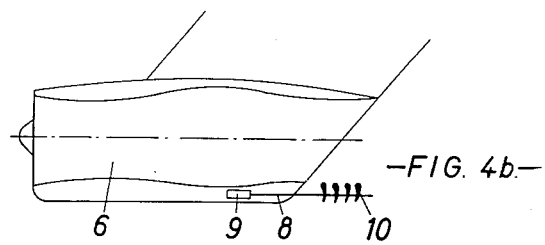
—FIG. 4b.—
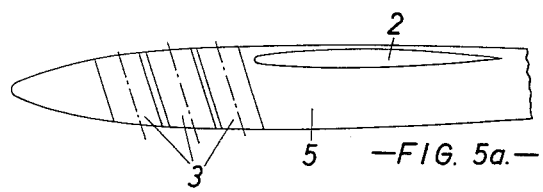
—FIG. 5a.—
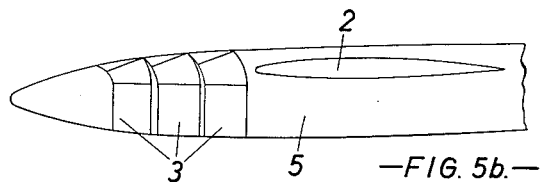
—FIG. 5b.—
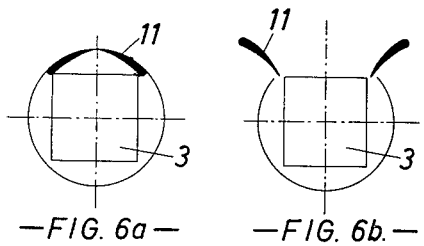
—FIG. 6a.—   —FIG. 6b.—
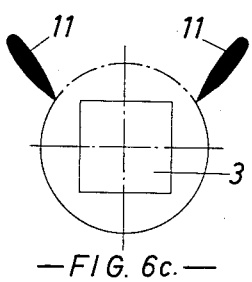
—FIG. 6c.—
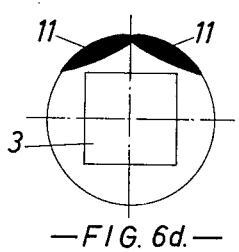
—FIG. 6d.—
INVENTORS
WILHELM O. SEIBOLD
GERHARD EGGERS
ROLF R.B. RICCIUS
ROLF STUESSEL
BY
Attorney

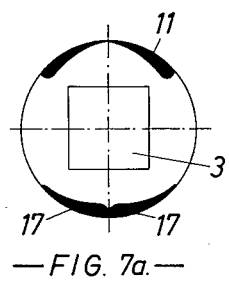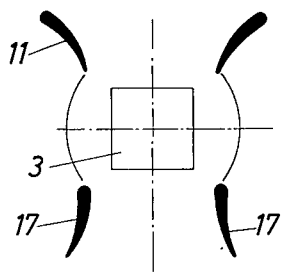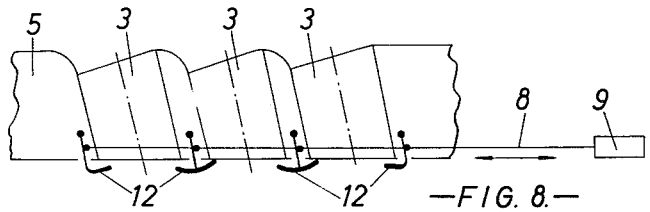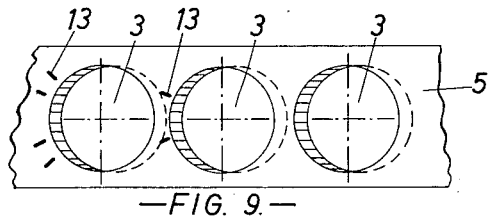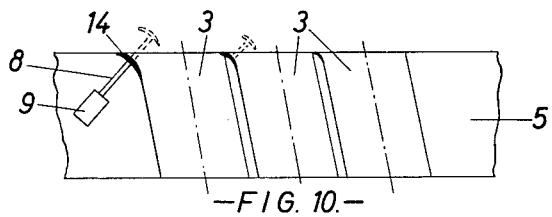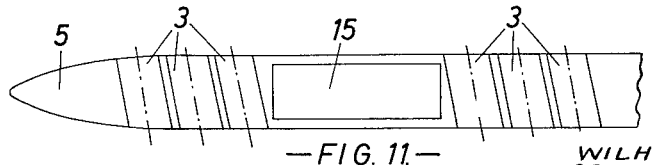

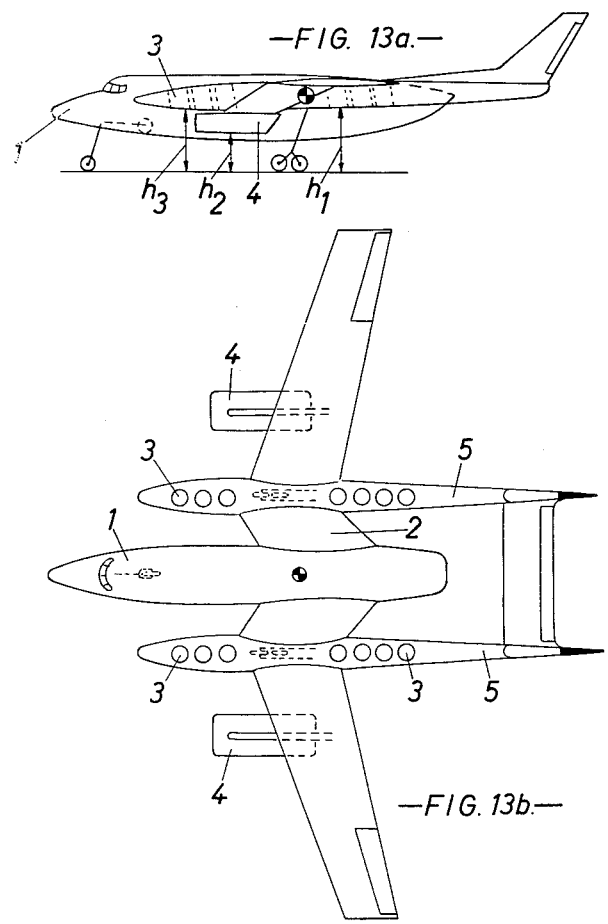

Dec. 14, 1965  W. O. SEIBOLD ETAL  3,223,354
VERTICAL TAKE OFF AND LANDING AIRCRAFT
Filed Jan. 4, 1962  6 Sheets-Sheet 6

INVENTORS
WILHELM O. SEIBOLD
GERHARD EGGERS
ROLF R.B. RICCIUS
ROLF STUESSEL

ATTORNEY

United States Patent Office 3,223,354
Patented Dec. 14, 1965

3,223,354
VERTICAL TAKE OFF AND LANDING AIRCRAFT
Wilhelm O. Seibold and Gerhard Eggers, Bremen, Rolf R. B. Riccius, Berlin-Mariendorf, and Rolf Stuessel, Bremen, Germany, assignors to Vereinigte Flugtechnische Werke Gesellschaft mit beschraenkter Haftung frueher "Weser" Flugzeugbau/Focke-Wulf/Heinkel-Flugzeugbau, Bremen-Flughafen, Germany
Filed Jan. 4, 1962, Ser. No. 164,282
Claims priority, application Germany, Jan. 7, 1961, F 32,924
6 Claims. (Cl. 244—12)

The present invention concerns vertical take-off and landing aircraft.

Various arrangements of the lifting engines are known for vertical take-off and landing aircraft.

It has already been proposed to use separate lifting and forward propulsion engines, the lifting engines being arranged either in and on the fuselage or in nacelles on the wings and tail unit tips. The installation of main lifting engines in the fuselage with its considerable requirement of space is economically unfavourable for commercial aircraft. Mounting on the fuselage is unfavourable because of the noise in connection with commercial aircraft. In both arrangements of the engines, moreover, the suction effect occurring thereby near the ground reduces the thrust, so that relativley large engines with a correspondingly high fuel consumption become necessary, which in turn reduce the payload and economic value of the aircraft. Installation of lifting engines on the wing tips and tail unit tips on the other hand due to the long lever arm relative to the length of fuselage axis with the unsymmetrical stoppage of such propulsion units result in a very unfavourable moment, whereby dangerous movements of the aircraft are initiated. To suppress these movements complicated devices are required for immediately cutting out the propulsion units opposite to the faulty propulsion units and to produce suitable control impulses whilst the cut-out propulsion units is running down.

It has furthermore been proposed to combine the purposes of forward propulsion and lifting units by using swivel jets. The disadvantage of such propulsion units on the one hand resides in the loss of thrust caused by the deflection, which in turn results in an increased fuel consumption and causes it to become uneconomical, and on the other hand in that for the vertical take-off considerably higher thrusts are necessary than for forward propulsion. A propulsion unit positioned for vertical take-off conditions will therefore necessarily operate in an uneconomic manner during forward propulsion due to excessive fuel consumption. The compromise enforced by the combination of these two different purposes in positioning the propulsion units makes an alternative solution impossible.

The present invention seeks to avoid these disadvantages.

According to the present invention for known symmetrical vertical take-off and landing aircraft are fitted with separate lifting and forward propulsion units, these units having a predetermined lateral spacing from one another, and several lifting units being assembled in groups accommodated in wing nacelles and the forward propulsion units constructed as thrust swivel propulsion units, are so arranged or constructed that the lifting unit nacelles, measured in width, are arranged to be at least 0.6 time, and at the most 3 times, the thickness of the nacelle from the side wall of the fuselage, and the lifting propulsion units in the direction of forward propulsion are mounted substantially in front of and/or behind the supporting wing structure, and the forward propulsion units are also arranged on the wings, such that both the resulting thrust vector of the entity of lifting propulsion units and the resulting thrust vector of the forward propulsion units in the lifting state pass through the centre of gravity of the aircraft.

The advantages of this arrangement resides in the fact that the lifting propulsion units important for vertical take-off and landing are arranged close to the centre of gravity, so that when one propulsion unit fails, relatively low torques occur about the longitudinal axis of the fuselage, in any case such which are readily controllable. These may be neutralized by the fact that when a propulsion unit fails, the momentarily opposite propulsion unit is cut-out.

This arrangement of the lifting propulsion units, which are situated substantially outside the outline of the aircraft, moreover, eliminates not only the reduction of lift due to the so-called ground effect, but there is even obtained an increase of lift. This arrangement therefore permits the size of the propulsion unit to be limited to a minimum together with a corresponding economy in weight and fuel, or increase in flying range, the payload and economy factor of the aircraft. A closed arrangement of the lifting propulsion units in groups is both advantageous from a stability and maintenance and constructional point of view. It is aerodynamically favourable, as the inlets with a suitably selected distance of the main propulsion unit nacelles from the fuselage remain free of interfering influences caused by the proximity thereof, and the inlet conditions of the main propulsion units situated at the back are favourably influenced by those situated in front, it being possible, by means of suitably mounted flaps, interference grids and/or vortex generators or the like, to influence the air flow appropriately, more especially the boundary layer, in front of the inlet of the first lifting propulsion unit, so that no devices or only a few small and simple devices are required to influence the flow and/or the boundary layer. Spoilers arranged in front of the lifting propulsion units may be run out to eliminate the flow and thereby to suppress undesired erecting torques caused due to negative pressure otherwise occurring at the inlet.

The use of separate lifting and forward propulsion units enables a favourable positioning to be achieved without compromise of the forward propulsion unit for forward propulsion conditions and hence maximum economic value. Moreover, when positioning the forward propulsion units as thrust swivel propulsion units, in which the jet emerging from the propulsion unit by suitable deflection may be used to increase the lifting power, the forward propulsion units may be so arranged that their resulting thrust vector in the lifting state, as it is necessary on vertical take-off and landing, passes through the centre of gravity of the aircraft.

When realizing the inventive concept it is advisable for the forward propulsion units to be constructed in known manner as twin propulsion units to increase the reliability and safety. The propulsion unit arrangement proposed in accordance with the invention enables a favourable accommodation of the reserve fuels in the proximity of the main propulsion units, namely in the nacelles, and thus should the fuel supply installation fail, it ensures a feed to the main propulsion units necessary for vertical take-off and landing. Due to the distance of the propulsion units from the fuselage, the possibility of a dampened mounting of the propulsion units in the nacelles and/or of the nacelles on the wing, and the nuisance of noise to passengers and crew is kept within tolerable limits.

The deflection of the forward propulsion thrust, for example, can be effected by means of spoilers and/or other elements known per se, which either lightly deflect the jet or split it up, so that the jet, for example, is engaged by a grid arranged on the underside of the nacelle and thereby deflected.

The deflection of the thrust jet is facilitated by the fact that the outlet of the forward propulsion unit is cut off obliquely, which has no negative effect on the forward propulsion power of the propulsion unit concerned.

For the purpose of simpler and more reliable starting the lifting propulsion units are rigidly mounted in the nacelles slightly forwardly inclined. They may also be vertically installed and fitted with tapered inlet elbows.

Flaps, which during forward propulsion cover the upper sides of the lifting propulsion units are so shaped that in the opened out state (take-off and landing) by their curvature and arrangement form an aerodynamically favourable inlet shape for stationary operation.

Accordingly the lower cover plates of the lifting propulsion unit too are so shaped that in the open position they form mixing chambers and due to increasing the flow passage contribute towards increasing the thrust.

For simplified and uniform actuation of baffle members (spoilers, nozzles, flaps or the like) mounted on the lower end of the lifting propulsion units, these members are interconnected, e.g., by means of mechanically acting coupling members.

By using the invention in connection with a high wing plane the ground distance of the propulsion unit is increased. It is advisable to gauge the distance of the propulsion unit outlets from the ground so that it amounts at least to one, preferably two or more nacelle diameters, whereby ground erosion temperature, thrust against the ground, noise nuisance and also negative influences on the stability and lifting power of the aircraft in the proximity of the ground are reduced.

The use of double sweeping back of the wings due to reduction of interference between fuselage and nacelle leads to a lower air resistance at high airspeeds and hence to higher performances.

The same purpose is served by an alternately applicable forward sweep of the wings between fuselage and main propulsion unit nacelle.

The lifting propulsion units are adapted in accordance with the invention to be started by extracting compressed air from one or more forward propulsion units, thus rendering unnecessary the installation of additional starters.

Compressed air optionally extracted from the forward propulsion and/or lifting propulsion units may be used in known manner for steering the aircraft by means of control jets, which are arranged on the wing tips, on the nose and stern of the fuselage, the efficiency of this steering being increased by fuel injection and heating up, or the steering regulated thereby and preferably the roll control is also assisted by thrust deflection of the lifting propulsion unit.

The invention will be described further, by way of example, with reference to the accompanying drawings, in which:

FIGS. 1a and 1b show schematically in plan and side view the embodiment of a vertical take-off and landing aircraft having a central fuselage 1 and in the vicinity thereof arranged on the wing 2 lifting propulsion units 3 and forward propulsion units 4 mounted further outwardly on the wing. The forward propulsion units in this example are arranged as twin propulsion units. The wing has a double backward sweep and high wing arrangement. The landing gear 18 is retractable.

FIGS. 2a and 2b show schematically in the same method of illustration an alternative design of aircraft according to FIGS. 1a and 1b having two lifting propulsion unit nacelles acting as tail unit supports 5.

FIG. 3 shows two members for thrust deflection adapted to be actuated individually or jointly. On the upper edge of the propulsion unit nacelle there is a spoiler 7, which via the rod mechanism 8 is actuated by a servo motor 9 and causes the thrust jet to be deflected. At the same time this example shows a grid 10 in the run out position on the underside of the nacelle.

FIG. 4a shows a propulsion unit nacelle 6 according to FIG. 3 but having an obliquely cut-off tail and with the grid 10 retracted during forward propulsion.

FIG. 4b shows the same arrangement with the grid 10 run out in the lifting, or take-off and landing position.

FIG. 5a shows a lifting propulsion unit nacelle 5 with three lifting propulsion units 3 rigidly mounted therein and forwardly inclined.

FIG. 5b shows an alternative arrangement of the lifting propulsion units 3 which are installed vertically rigidly mounted in the propulsion unit nacelles 5 and have inclined inlet elbows on the upper end.

FIG. 6a shows lifting propulsion units 3 during forward propulsion with closed upper flat cover bodies 11 in front view.

FIG. 6b shows lifting propulsion units 3 with flat cover bodies 11 open for take-off and landing or stationary operation and forming a smooth inlet due to the aerodynamically favourable configuration.

FIGS. 6c and 6d show alternative arrangements of the cover bodies made, e.g., of sheet metal and in the opened and closed position.

Figure 14:
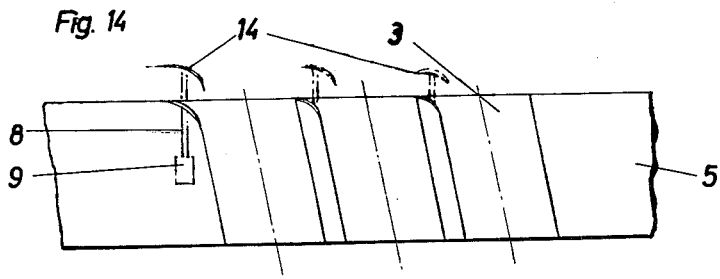

FIG. 7a shows lifting propulsion units 3 in the lifting propulsion unit nacelles 5 with closed upper cover bodies 11 and closed lower cover bodies 17 during forward propulsion.

FIG. 7b shows the upper 11 and lower 17 cover bodies opened for take off and landing and also stationary operation, which due to their special arrangement form mixing chambers and owing to increase of the flow passage improve the thrust.

FIG. 8 shows a group 3 of lifting propulsion units with spoilers or other known jet deflection members 12 arranged below and between the groups. In the example spoilers 12 are shown which are mechanically linked. They are actuated via rod mechanisms 8 and a servo motor 9.

FIG. 9 is a plan view of a lifting propulsion nacelle 5 with the members for influencing the flow or boundary layer 13 situated in front of the inlet of the lifting propulsion units 3.

FIG. 10 shows a flap 14 adapted to influence the flow arranged at the frontmost lifting propulsion unit inlet and actuated by means of rod mechanisms 8 and a servo motor 9. To increase the effect flaps of smaller construction are provided at each of the inlets of the lifting propulsion units arranged behind.

FIG. 11 shows the accommodation of a reserve fuel tank 15 in the approximate vicinity of the lifting propulsion unit nacelles 5 between the front and rear groups of lifting propulsion units.

FIG. 12 shows a lifting propulsion unit nacelle 5 with two lifting propulsion units 3 and disposed in front thereof a spoiler 16 adapted to eliminate the flow and which is wedge-shaped in the manner of a breakwater.

FIGS. 13a and 13b show schematically in plan and side view the design of a vertical take-off and landing aircraft having forwardly swept wings 2 between the fuselage 1 and the lifting propulsion unit nacelles 5. In the example three of the lifting propulsion units 3 arranged in groups are arranged in front of and four behind the supporting structure of the wings. The spaces $h_1$, $h_2$ and $h_3$ between the propulsion unit outlets and the ground amount to more than a nacelle diameter. The forward propulsion units 4 are arranged approximately level with the centre of gravity of the surface of the wing portion situated outside the lifting propulsion unit nacelle. This is the preferred arrangement of the forward propulsion units (see also FIGS. 1 and 2). The illustration is in no way intended to be limiting since, for example, an arrangement between the lifting propulsion unit nacelles and the fuselage is possible, which however owing to the thrust losses on take-off connected therewith is a disadvantage relative to the arrangement shown.

FIG. 14 shows the location of flaps in front of the propulsion unit. The flaps 14 are projected and retracted by rods 8 connected to the flaps and to servo motor 9.

Figure 15:
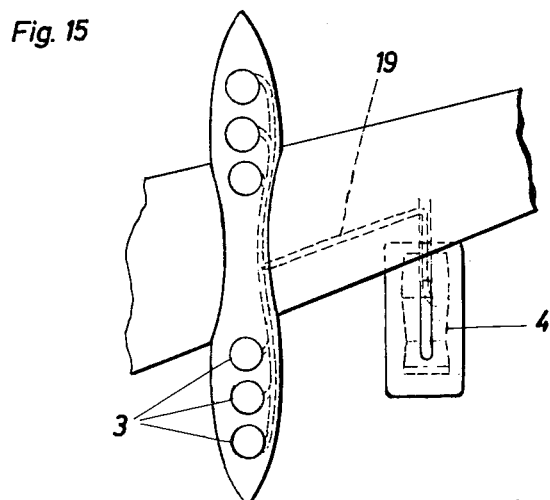

FIG. 15 shows a lifting engine 4 wherein air is withdrawn at a suitable point, e.g., behind the compressor, and is conducted via a conduit system 19 to the lifting engines 3 and is used to start the lifting engines.

Figure 16:
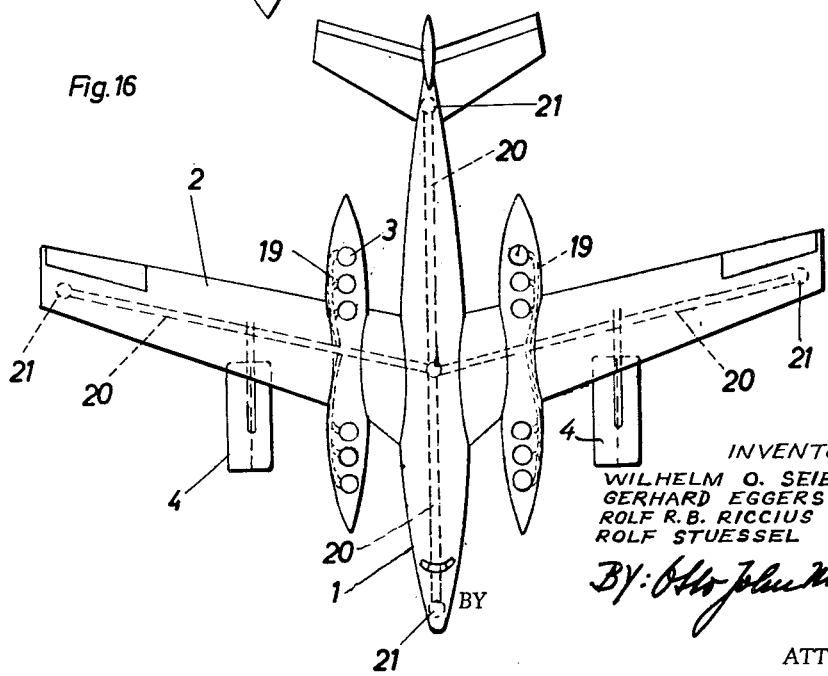

FIG. 16 shows the aircraft 1 with wings 2 and lifting and propulsion engines 3 and 4. For reaction control the engines are connected with each other via a conduit system 19 and 20 with control jets 21 at the ends of the fuselage and wings for supplying compressed air thereto.

We claim:

1. In a vertical take-off and landing aircraft having a fuselage with a central fore-and-aft axis, and right and left wings fixed with and extending outwardly from said fuselage, right and left nacelle means each carried by a respective one of said wings in outwardly spaced relation with respect to said fuselage and symmetrical with and parallel to said axis, and a pair of lifting propulsion units carried by each said nacelle means, one said unit being forwardly of the leading edge of its wing and the other said unit being rearwardly of the trailing edge of its wing, right and left forward jet propulsion units, each carried by a respective one of said wings in outwardly-spaced relation with respect to the corresponding one of said nacelles, deflector means carried by each said forward jet propulsion unit and movable from a first position out of the exhaust from its unit, to a second position within, and deflecting downwardly, a portion of the exhaust gases emerging from its unit, and means operable to move each said deflector means between said first and said second positions.

2. The aircraft of claim 1, said deflector means comprising a pair of grid assemblies, each said assembly being mounted below and contiguous the exhaust outlet of its unit, and movable from a first retracted position out of the blast from said exhaust outlet, to a second position within the blast from said exhaust outlet, each said assembly when in its second position, deflecting downwardly a portion of the exhaust gases to thereby create a thrust having a vertical component.

3. In a vertical take-off and landing aircraft having a fuselage with a fore-and-aft axis of symmetry, and right and left wings, fixed with and extending outwardly from said fuselage, right and left nacelles each carried by a respective one of said wings in parallel symmetrical relation with respect to said axis and in outwardly-spaced relation with respect to said fuselage, each said nacelle having fore and aft portions projecting forwardly and rearwardly from the leading and trailing edges, respectively, of its wing, and four lifting propulsion units each carried by a respective projecting portion of said nacelles, the central axis of said lifting propulsion units of each said nacelle lying in a respective one of two vertical planes parallel with and symmetrically disposed upon opposite sides of said fore-and-aft axis, all said lifting propulsion units being of the jet reaction type and being constructed and arranged, each with respect to its nacelle, to effect a resultant thrust having a forward component, said propulsion units being mounted with their axes inclined upwardly and forwardly at an acute angle, a plurality of vanes each mounted adjacent the leading edge of the intake opening of a respective one of said units, each said vane being translatable from a first position contiguous said edge, to a second position upwardly and rearwardly in spaced relation with said edge, and means connected with said vanes for positively and selectively moving the same between said positions.

4. In a vertical take-off and landing aircraft having a fuselage with a central fore-and-aft axis of symmetry, and right and left wings fixed with and extending outwardly from respective sides of said fuselage, right and left nacelles each carried by a respective one of said wings in outward spaced relation with respect to said fuselage, each said nacelle having front and rear end portions projecting from the leading and trailing edges, respectively, of its wing, and two groups of lifting propulsion units, each said group including a plurality of lifting propulsion units carried, in substantially vertical position, by a respective one of said front and rear portions of each said nacelle, and right and left forward jet propulsion units each carried by a respective one of said wings in outwardly-spaced relation with its corresponding nacelle, said lifting and forward propulsion units being positioned symmetrically with respect to said fore-and-aft axis, whereby the net moment of thrust about said fore-and-aft axis is substantially zero, each said forward propulsion unit being constructed and arranged to selectively effect a variable vertical thrust component in its wing, each said forward propulsion unit having its exhaust end lying substantially in a plane rearwardly and upwardly inclined with respect to said axis, and a grid assembly mounted below and contiguous said exhaust end of each said forward propulsion unit and movable from a first retracted position out of the blast from said exhaust end, to a second extended position within the blast of said exhaust end, each said grid assembly when in extended position deflecting downwardly a portion of the exhaust gases expelled from its unit.

5. In a vertical take-off and landing aircraft, a fuselage having a longitudinal fore-and-aft axis of symmetry and right and left wings fixed with and extending from respective opposite sides of said fuselage, right and left nacelles each carried by a respective one of said wings in outwardly-spaced relation with respect to said fuselage, each said nacelle having forward and rearward ends projecting forwardly and rearwardly from the leading and trailing edges of its wing, respectively, each said nacelle having a longitudinal axis parallel with said fore-and-aft axis, and groups of three lift propulsion units each, each said group being positioned substantially vertically in a respective one of said projecting ends, the vertical axes of said lift propulsion units of each said nacelle lying in a respective one of two vertical planes each said plane being parallel with and symmetric with respect to said fore-and-aft axis, and a pair of forward jet propulsion units mounted upon each said wing in outwardly symmetrical relation with respect to the corresponding one of said nacelles, each said forward jet propulsion unit having gas jet deflectors swivelly mounted to effect a selectively variable vertical lift component, each said wing having a root portion swept back at a greater angle, and a main portion swept back at a smaller angle with respect to the horizontal normal to said fore-and-aft axis, each said nacelle being located at the junction between said portions of its respective wing.

6. In a vertical take-off and landing aircraft, a fuselage having a longitudinal fore-and-aft axis of symmetry and right and left wings fixed with and extending from respective opposite sides of said fuselage, right and left nacelles each carried by a respective one of said wings in outwardly-spaced relation with respect to said fuselage, each said nacelle having forward and rearward ends projecting forwardly and rearwardly from the leading and trailing edges of its wing, respectively, each said nacelle having a longitudinal axis parallel with said fore-and-aft axis, and groups of three lift propulsion units each, each said group being positioned substantially vertically in a respective one of said projecting ends, the vertical axes of said lift propulsion units of each said nacelle lying in a respective one of two vertical planes each said plane being parallel with and symmetric with respect to said fore-and-aft axis, and a pair of forward jet propulsion units mounted upon each said wing in outwardly symmetrical relation with respect to the corresponding one of said nacelles, each said forward jet propulsion unit having gas jet deflectors swivelly mounted to effect a selectively variable vertical lift component, each said wing having a forwardly-swept root portion, and a rearwardly-swept main portion, each said nacelle being positioned at the junction between said portions.

References Cited by the Examiner

UNITED STATES PATENTS

| | | | |
|---|---|---|---|
| 2,930,544 | 3/1960 | Howell | 244—12 |
| 2,968,452 | 1/1961 | Cook | 244—12 |
| 3,031,155 | 4/1962 | Kerry | 244—12 |
| 3,066,889 | 12/1962 | Kelly | 244—12 |
| 3,120,362 | 2/1964 | Curtis | 244—12 X |

FOREIGN PATENTS 1,255,658  1/1961  France.

OTHER REFERENCES

Space-Aeronautics Magazine, September 1960; pages 59–61.

MILTON BUCHLER, *Primary Examiner.*

R. DAVID BLAKESLEE, FERGUS S. MIDDLETON,
  *Examiners.*